United States Patent
Aloni et al.

(10) Patent No.: US 8,416,768 B2
(45) Date of Patent: *Apr. 9, 2013

(54) METHOD AND SYSTEM FOR TRANSPARENT TCP OFFLOAD WITH BEST EFFORT DIRECT PLACEMENT OF INCOMING TRAFFIC

(75) Inventors: Eliezer Aloni, Zur Yigal (IL); Rafi Shalom, Givat Shmuel (IL); Shay Mizrachi, Hod HaSharon (IL); Dov Hirshfeld, Givat Shmuel (IL); Aviv Greenberg, Netanya (IL); Assaf Grunfeld, Hod HaSharon (IL); Eliezer Tamir, Beit Shemesh (IL); Guy Corem, Herzlia (IL); Ori Hanegbi, Herzlia (IL)

(73) Assignee: Broadcom Israel Research Ltd., Ramat Gan (IL)

( * ) Notice: Subject to any disclaimer, the term of this patent is extended or adjusted under 35 U.S.C. 154(b) by 380 days.

This patent is subject to a terminal disclaimer.

(21) Appl. No.: 12/754,016

(22) Filed: Apr. 5, 2010

(65) Prior Publication Data

US 2010/0198984 A1 Aug. 5, 2010

Related U.S. Application Data

(63) Continuation of application No. 11/489,389, filed on Jul. 18, 2006, now Pat. No. 7,693,138.

(60) Provisional application No. 60/700,544, filed on Jul. 18, 2005.

(51) Int. Cl.
*H04L 12/28* (2006.01)
(52) U.S. Cl. .......................... 370/352; 370/235; 709/217
(58) Field of Classification Search ........................ None
See application file for complete search history.

(56) References Cited

U.S. PATENT DOCUMENTS

| | | | |
|---|---|---|---|
| 5,940,404 A | 8/1999 | Delp et al. | |
| 6,434,620 B1 * | 8/2002 | Boucher et al. | 709/230 |
| 6,907,042 B1 | 6/2005 | Oguchi | |
| 6,958,997 B1 | 10/2005 | Bolton | |
| 7,142,540 B2 * | 11/2006 | Hendel et al. | 370/392 |
| 7,174,393 B2 * | 2/2007 | Boucher et al. | 709/250 |
| 7,277,963 B2 | 10/2007 | Dolson et al. | |
| 7,299,266 B2 * | 11/2007 | Boyd et al. | 709/213 |
| 7,359,326 B1 | 4/2008 | Harper et al. | |
| 7,376,755 B2 | 5/2008 | Pandya | |
| 7,397,800 B2 | 7/2008 | Elzur | |
| 7,596,628 B2 * | 9/2009 | Aloni et al. | 709/235 |
| 7,613,813 B2 * | 11/2009 | Hussain et al. | 709/227 |
| 7,684,344 B2 * | 3/2010 | Aloni et al. | 370/252 |

(Continued)

*Primary Examiner* — Michael J Moore, Jr.
(74) *Attorney, Agent, or Firm* — Thomas | Horstemeyer, LLP

(57) ABSTRACT

Certain aspects of a method and system for transparent transmission control protocol (TCP) offload with best effort direct placement of incoming traffic are disclosed. Aspects of a method may include collecting TCP segments in a network interface card (NIC) processor without transferring state information to a host processor every time a TCP segment is received. When an event occurs that terminates the collection of TCP segments, the NIC processor may generate a new aggregated TCP segment based on the collected TCP segments. If a placement sequence number corresponding to the generated new TCP segment for the particular network flow is received before the TCP segment is received, the generated new TCP segment may be transferred directly from the memory to the user buffer instead of transferring the data to a kernel buffer, which would require further copy by the host stack from kernel buffer to user buffer.

20 Claims, 6 Drawing Sheets

U.S. PATENT DOCUMENTS

| | | | |
|---|---|---|---|
| 7,693,138 B2 * | 4/2010 | Aloni et al. | 370/352 |
| 7,853,723 B2 * | 12/2010 | Boucher et al. | 709/250 |
| 7,966,417 B2 * | 6/2011 | Aloni et al. | 709/235 |
| 8,131,880 B2 * | 3/2012 | Boucher et al. | 709/250 |
| 2002/0071436 A1 | 6/2002 | Border et al. | |
| 2005/0066056 A1 | 3/2005 | Dominic | |
| 2005/0108518 A1 | 5/2005 | Pandya | |

* cited by examiner

METHOD AND SYSTEM FOR TRANSPARENT TCP OFFLOAD WITH BEST EFFORT DIRECT PLACEMENT OF INCOMING TRAFFIC

CROSS-REFERENCE TO RELATED APPLICATIONS/INCORPORATION BY REFERENCE

This patent application is a continuation of U.S. application Ser. No. 11/489,389 filed on Jul. 18, 2006, now U.S. Pat. No. 7,693,138, which application makes reference to, claims priority to and claims benefit from U.S. Provisional Patent Application Ser. No. 60/700,544, filed on Jul. 18, 2005.

This application also makes reference to:
U.S. application Ser. No. 11/489,388 filed on Jul. 18, 2006, issued as U.S. Pat. No. 7,684,344 on Mar. 23, 2010;
U.S. application Ser. No. 11/489,407 filed on Jul. 18, 2006;
U.S. application Ser. No. 11/489,300 filed on Jul. 18, 2006, issued as U.S. Pat. No. 7,596,638 on Sep. 29, 2009;
U.S. application Ser. No. 11/489,078 filed on Jul. 18, 2006;
U.S. application Ser. No. 11/489,393 filed on Jul. 18, 2006; and
U.S. application Ser. No. 11/489,390 filed on Jul. 18, 2006.

Each of the above referenced applications is hereby incorporated herein by reference in its entirety.

FIELD OF THE INVENTION

Certain embodiments of the invention relate to processing of TCP data and related TCP information. More specifically, certain embodiments of the invention relate to a method and system for transparent TCP offload with best effort direct placement of incoming traffic.

BACKGROUND OF THE INVENTION

There are different approaches for reducing the processing power of TCP/IP stack processing. In a TCP Offload Engine (TOE), the offloading engine performs all or most of the TCP processing, presenting to the upper layer a stream of data. There may be various disadvantages to this approach. The TTOE is tightly coupled with the operating system and therefore requires solutions that are dependent on the operating system and may require changes in the operating system to support it. The TTOE may require a side by side stack solution, requiring some kind of manual configuration, either by the application, for example, by explicitly specifying a socket address family for accelerated connections. The TTOE may also require some kind of manual configuration by an IT administrator, for example, by explicitly specifying an IP subnet address for accelerated connections to select which of the TCP flows will be offloaded and the offload engine is very complex as it needs to implement TCP packet processing.

Large segment offload (LSO)/transmit segment offload (TSO) may be utilized to reduce the required host processing power by reducing the transmit packet processing. In this approach the host sends to the NIC, bigger transmit units than the maximum transmission unit (MTU) and the NIC cuts them to segments according to the MTU. Since part of the host processing is linear to the number of transmitted units, this reduces the required host processing power. While being efficient in reducing the transmit packet processing, LSO does not help with receive packet processing. In addition, for each single large transmit unit sent by the host, the host would receive from the far end multiple ACKs, one for each MTU-sized segment. The multiple ACKs require consumption of scarce and expensive bandwidth, thereby reducing throughput and efficiency.

In large receive offload (LRO), a stateless receive offload mechanism, the TCP flows may be split to multiple hardware queues, according to a hash function that guarantees that a specific TCP flow would always be directed into the same hardware queue. For each hardware queue, the mechanism takes advantage of interrupt coalescing to scan the queue and aggregate subsequent packets on the queue belonging to the same TCP flow into a single large receive unit.

While this mechanism does not require any additional hardware from the NIC besides multiple hardware queues, it may have various performance limitations. For example, if the number of flows were larger than the number of hardware queues, multiple flows would fall into the same queue, resulting in no LRO aggregation for that queue. If the number of flows is larger than twice the number of hardware queues, no LRO aggregation is performed on any of the flows. The aggregation may be limited to the amount of packets available to the host in one interrupt period. If the interrupt period is short, and the number of flows is not small, the number of packets that are available to the host CPU for aggregation on each flow may be small, resulting in limited or no LRO aggregation, even if the number of hardware queues is large. The LRO aggregation may be performed on the host CPU, resulting in additional processing. The driver may deliver to the TCP stack a linked list of buffers comprising of a header buffer followed by a series of data buffers, which may require more processing than in the case where all the data is contiguously delivered on one buffer.

Accordingly, the computational power of the offload engine needs to be very high or at least the system needs a very large buffer to compensate for any additional delays due to the delayed processing of the out-of-order segments. When host memory is used for temporary storage of out-of-order segments, additional system memory bandwidth may be consumed when the previously out-of-order segments are copied to respective buffers. The additional copying provides a challenge for present memory subsystems, and as a result, these memory subsystems are unable to support high rates such as 10 Gbps.

In general, one challenge faced by TCP implementers wishing to design a flow-through NIC, is that TCP segments may arrive out-of-order with respect to the order placed in which they were transmitted. This may prevent or otherwise hinder the immediate processing of the TCP control data and prevent the placing of the data in a host buffer. Accordingly, an implementer may be faced with the option of dropping out-of-order TCP segments or storing the TCP segments locally on the NIC until all the missing segments have been received. Once all the TCP segments have been received, they may be reordered and processed accordingly. In instances where the TCP segments are dropped or otherwise discarded, the sending side may have to re-transmit all the dropped TCP segments and in some instances, may result in about a fifty percent (50%) decrease in throughput or bandwidth utilization.

There are different approaches for reducing the processing power of TCP/IP stack processing. In a TCP Offload Engine (TOE), the offloading engine performs all or most of the TCP processing, presenting to the upper layer a stream of data. There may be various disadvantages to this approach. The TOE is tightly coupled with the operating system and therefore requires solutions that are dependent on the operating system and may require changes in the operating system to support it. The TOE may require a side by side stack solution, requiring some kind of manual configuration, either by the application, for example, by explicitly specifying a socket address family for accelerated connections. The TOE may also require some kind of manual configuration by an IT administrator, for example, by explicitly specifying an IP subnet address for accelerated connections to select which of the TCP flows will be offloaded and the offload engine is very complex as it needs to implement TCP packet processing.

Large segment offload (LSO)/transmit segment offload (TSO) may be utilized to reduce the required host processing power by reducing the transmit packet processing. In this approach the host sends to the NIC, bigger transmit units than the maximum transmission unit (MTU) and the NIC cuts them to segments according to the MTU. Since part of the host processing is linear to the number of transmitted units, this reduces the required host processing power. While being efficient in reducing the transmit packet processing, LSO does not help with receive packet processing. In addition, for each single large transmit unit sent by the host, the host would receive from the far end multiple ACKs, one for each MTU-sized segment. The multiple ACKs require consumption of scarce and expensive bandwidth, thereby reducing throughput and efficiency.

During conventional TCP processing, each of the plurality of TCP segments received would have to be individually processed by a host processor in the host system. TCP processing requires extensive CPU processing power in terms of both protocol processing and data placement on the receiver side. Current processing systems and methods involve the transfer of TCP state to a dedicated hardware such as a NIC, where significant changes to host TCP stack and/or underlying hardware are required.

The host processing power may be consumed by the copying of data between user space and kernel space in the TCP/IP stack. Some solutions have been proposed to reduce the host processing power. For example, utilizing remote direct memory access (RDMA) avoids memory copy in both transmit and receive directions. However, this requires a new application programming interface (API), a new wire protocol, and modifications to existing applications at both sides of the wire. A local DMA engine may be utilized to offload memory copy in both transmit and receive directions. Although a local DMA engine may offload copying operations from the CPU, it does not relieve the memory bandwidth required. The memory bandwidth may be a severe bottleneck in high speed networking applications as platforms are shifting to multiple CPU architectures, with multiple cores in each CPU architecture, all sharing the same memory.

When the host processor has to perform a read/write operation, a data buffer has to be allocated in the user space. A read operation may be utilized to copy data from the file into this allocated buffer. A write operation may be utilized to transmit the contents of the buffer to a network. The OS kernel has to copy all data from the user space into the kernel space. Copy operations are CPU and memory bandwidth intensive, limiting system performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for transparent TCP offload with best effort direct placement of incoming traffic, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transparent TCP offload with best effort direct placement of incoming traffic. Aspects of the method and system may comprise collecting TCP segments in a network interface card (NIC) processor without transferring state information to a host processor every time a TCP segment is received. When an event occurs that terminates the collection of TCP segments, the NIC processor may generate a new aggregated TCP segment based on the collected TCP segments. If a placement sequence number corresponding to the generated new TCP segment for the particular network flow is received before the TCP segment is received, the generated new TCP segment may be transferred directly from the memory to the user buffer instead of transferring the data to a kernel buffer, which would require further copy by the host stack from kernel buffer to user buffer.

Figure 1A:
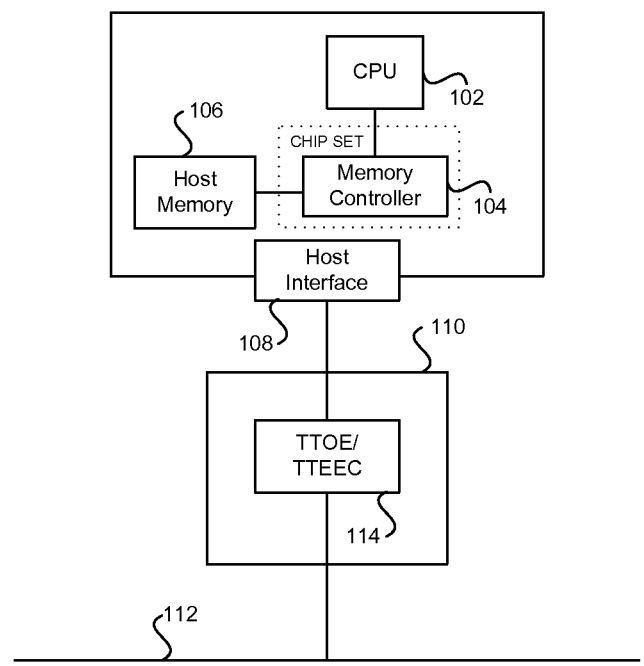
FIG. 1A is a block diagram of an exemplary system for transparent TCP offload, in accordance with an embodiment of the invention.

FIG. 1A is a block diagram of an exemplary system for transparent TCP offload, in accordance with an embodiment of the invention. Accordingly, the system of FIG. 1A may be adapted to handle transparent TCP offload of transmission control protocol (TCP) datagrams or packets. Referring to FIG. 1A, the system may comprise, for example, a CPU 102, a memory controller 104, a host memory 106, a host interface 108, network subsystem 110 and an Ethernet 112. The network subsystem 110 may comprise, for example, a transparent TCP-enabled Ethernet Controller (TTEEC) or a transparent TCP offload engine (TTOE) 114. The network subsystem 110 may comprise, for example, a network interface card (NIC). The host interface 108 may be, for example, a peripheral component interconnect (PCI), PCI-X, PCI-Express, ISA, SCSI or other type of bus. The memory controller 104 may be coupled to the CPU 102, to the host memory 106 and to the host interface 108. The host interface 108 may be coupled to the network subsystem 110 via the TTEEC/TTOE 114.

Figure 1B:
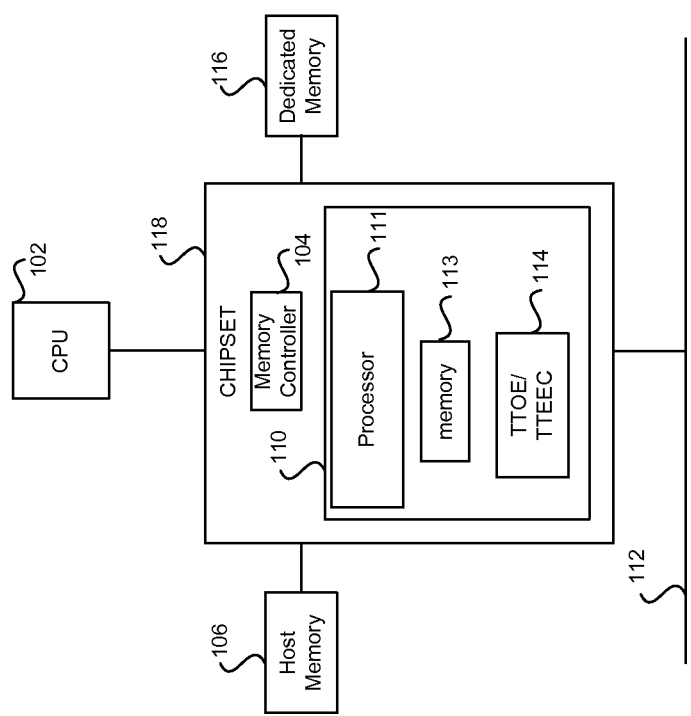
FIG. 1B is a block diagram of another exemplary system for transparent TCP offload, in accordance with an embodiment of the invention.

FIG. 1B is a block diagram of another exemplary system for transparent TCP offload, in accordance with an embodiment of the invention. Referring to FIG. 1B, the system may comprise, for example, a CPU 102, a host memory 106, a dedicated memory 116 and a chip set 118. The chip set 118 may comprise, for example, the single integrated circuit or network subsystem 110 and the memory controller 104. The chip set 118 may be coupled to the CPU 102, to the host memory 106, to the dedicated memory 116 and to the Ethernet 112. The network subsystem 110 of the chip set 118 may be coupled to the Ethernet 112. The network subsystem 110 may comprise, for example, the TTEEC/TTOE 114 that may be coupled to the Ethernet 112. The network subsystem 110 may communicate to the Ethernet 112 via a wired and/or a wireless connection, for example. The wireless connection may be a wireless local area network (WLAN) connection as supported by the IEEE 802.11 standards, for example. The network subsystem 110 may also comprise, for example, an on-chip memory 113. The dedicated memory 116 may provide buffers for context and/or data.

The network subsystem 110 may comprise a processor 111. Although illustrated, for example, as a CPU and an Ethernet, the present invention need not be so limited to such examples and may employ, for example, any type of processor and any type of data link layer or physical media, respectively. Accordingly, although illustrated as coupled to the Ethernet 112, the TTEEC or the TTOE 114 of FIG. 1A may be adapted for any type of data link layer or physical media. Furthermore, the present invention also contemplates different degrees of integration and separation between the components illustrated in FIGS. 1A-B. For example, the TTEEC/TTOE 114 may be a separate integrated chip from the chip set 118 embedded on a motherboard or may be embedded in a NIC. Similarly, the processor 111 may be a separate integrated chip from the chip set 118 embedded on a motherboard or may be embedded in a NIC. In addition, the dedicated memory 116 may be integrated with the chip set 118 or may be integrated with the network subsystem 110 of FIG. 1B.

Figure 1C:
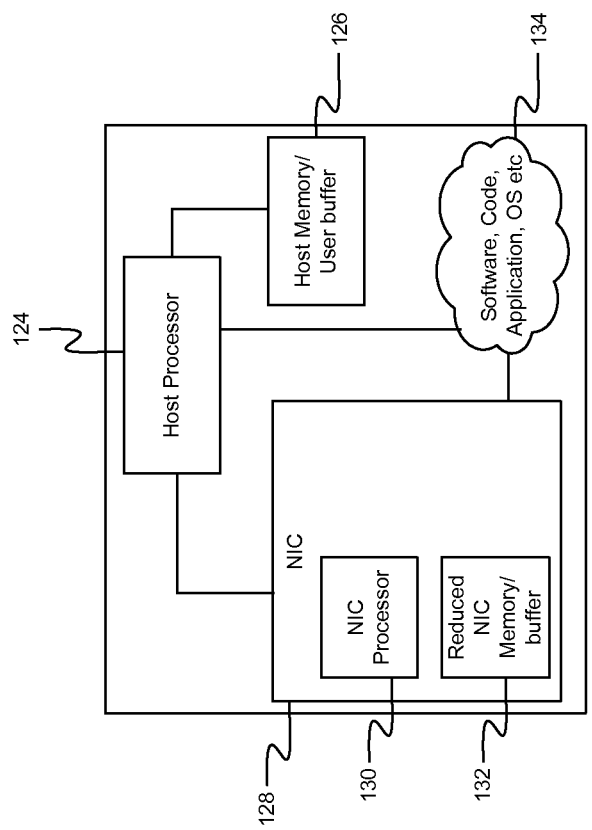
FIG. 1C is an alternative embodiment of an exemplary system for transparent TCP offload, in accordance with an embodiment of the invention.

FIG. 1C is an alternative embodiment of an exemplary system for transparent TCP offload, in accordance with an embodiment of the invention. Referring to FIG. 1C, there is shown a host processor 124, a host memory/buffer 126, a software algorithm block 134 and a NIC block 128. The NIC block 128 may comprise a NIC processor 130 and a reduced NIC memory/buffer block 132. The NIC block 128 may communicate with an external network via a wired and/or a wireless connection, for example. The wireless connection may be a wireless local area network (WLAN) connection as supported by the IEEE 802.11 standards, for example. The processor 131 may be a dedicated processor or hardware state machine that may reside in the packet-receiving path. The host TCP stack may comprise software that enables management of the TCP protocol processing and may be part of an operating system, such as Microsoft Windows or Linux.

In accordance with certain embodiments of the invention, providing a single aggregated TCP segment to the host for TCP processing significantly reduces overhead processing by the host 124. Furthermore, since there is no transfer of TCP state information, dedicated hardware such as a NIC 128 may assist with the processing of received TCP segments by coalescing or aggregating multiple received TCP segments so as to reduce per-packet processing overhead.

In conventional TCP processing systems, it is necessary to know certain information about a TCP connection prior to arrival of a first segment for that TCP connection. In accordance with various embodiments of the invention, it is not necessary to know about the TCP connection prior to arrival of the first TCP segment since the TCP state or context information is still solely managed by the host TCP stack and there is no transfer of state information between the hardware stack and the software stack at any given time.

Figure 1D:
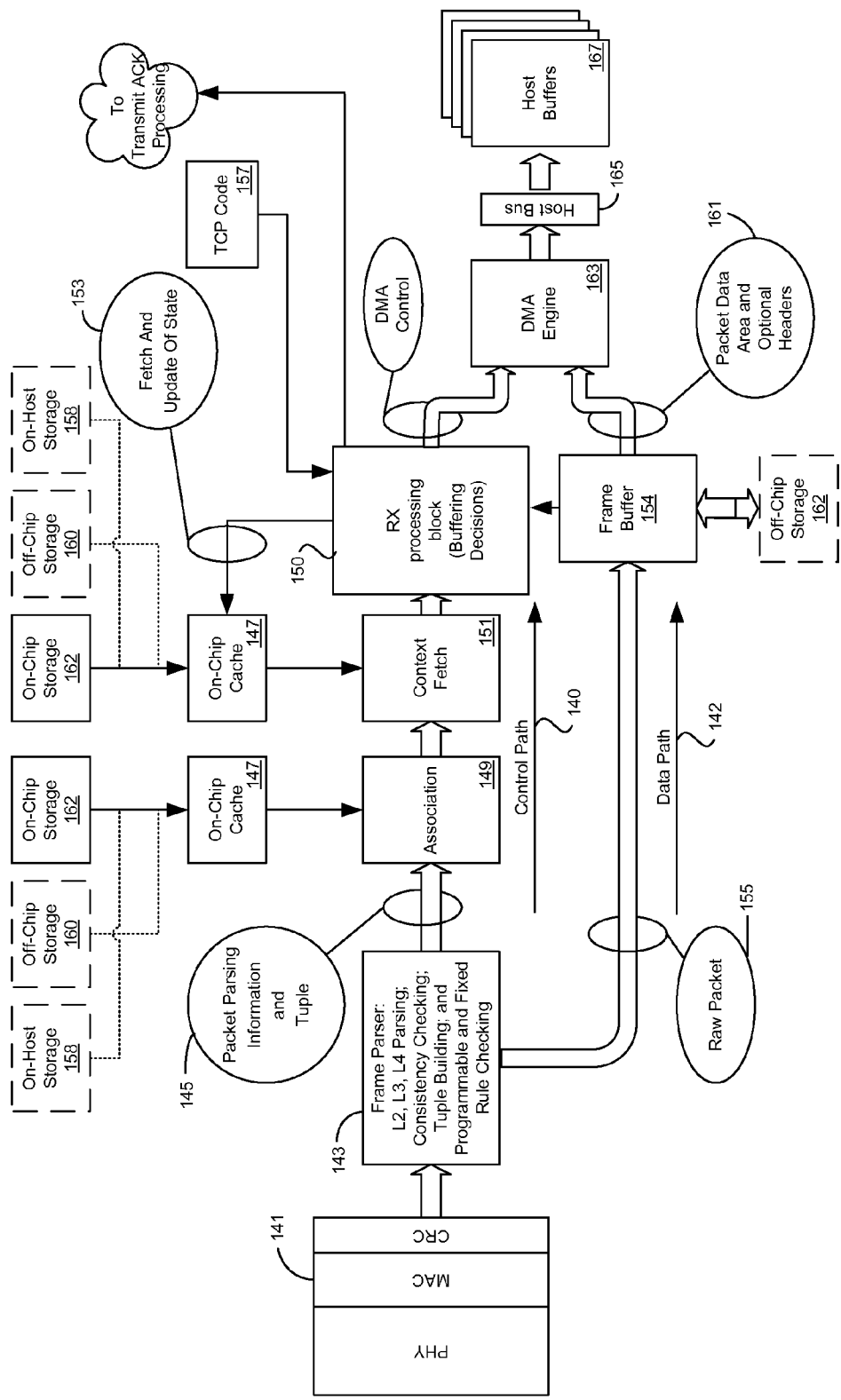
FIG. 1D is a block diagram of a system for handling transparent TCP offload, in accordance with an embodiment of the invention.

FIG. 1D is a block diagram of a system for handling transparent TCP offload, in accordance with an embodiment of the invention. Referring to FIG. 1D, there is shown an incoming packet frame 141, a frame parser 143, an association block 149, a context fetch block 151, a plurality of on-chip cache blocks 147, a plurality of off-chip storage blocks 160, a plurality of on-chip storage blocks 162, a RX processing block 150, a frame buffer 154, a DMA engine 163, a TCP code block 157, a host bus 165, and a plurality of host buffers 167.

The frame parser 143 may comprise suitable logic, circuitry and/or code that may enable L2 Ethernet processing including, for example, address filtering, frame validity and error detection of the incoming frames 141. Unlike an ordinary Ethernet controller, the next stage of processing may comprise, for example, L3 such as IP processing and L4 such as TCP processing within the frame parser 143. The TTEEC 114 may reduce the host CPU 102 utilization and memory bandwidth, for example, by processing traffic on coalesced TCP/IP flows. The TTEEC 114 may detect, for example, the protocol to which incoming packets belong based on the packet parsing information and tuple 145. If the protocol is TCP, then the TTEEC 114 may detect whether the packet corresponds to an offloaded TCP flow, for example, a flow for which at least some TCP state information may be kept by the TTEEC 114. If the packet corresponds to an offloaded connection, then the TTEEC 114 may direct data movement of the data payload portion of the frame. The destination of the payload data may be determined from the flow state information in combination with direction information within the frame. The destination may be a host memory 106, for example. Finally, the TTEEC 114 may update its internal TCP and higher levels of flow state, without any coordination with the state of the connection on the host TCP stack, and may obtain the host buffer address and length from its internal flow state.

The receive system architecture may comprise, for example, a control path processing 140 and data movement engine 142. The system components above the control path as illustrated in upper portion of FIG. 1D, may be designed to deal with the various processing stages used to complete, for example, the L3/L4 or higher processing with maximal flexibility and efficiency and targeting wire speed. The result of the stages of processing may comprise, for example, one or more packet identification cards that may provide a control structure that may carry information associated with the frame payload data. This may have been generated inside the TTEEC 114 while processing the packet in the various blocks. A data path 142 may move the payload data portions or raw packets 155 of a frame along from, for example, an on-chip packet frame buffer 154 and upon control processing completion, to a direct memory access (DMA) engine 163 and subsequently to the host buffer 167 via the host bus 165 that was chosen via processing. The data path 142 to the DMA engine may comprise packet data are optional headers 161.

The receiving system may perform, for example, one or more of the following: parsing the TCP/IP headers 145; associating the frame with a TCP/IP flow in the association block 149; fetching the TCP flow context in the context fetch block 151; processing the TCP/IP headers in the RX processing block 150; determining header/data boundaries and updating state 153; mapping the data to a host buffers; and transferring the data via a DMA engine 163 into these host buffers 167.

The headers may be consumed on chip or transferred to the host buffers 167 via the DMA engine 163.

The packet frame buffer 154 may be an optional block in the receive system architecture. It may be utilized for the same purpose as, for example, a first-in-first-out (FIFO) data structure is used in a conventional L2 NIC or for storing higher layer traffic for additional processing. The packet frame buffer 154 in the receive system may not be limited to a single instance. As control path 140 processing is performed, the data path 142 may store the data between data processing stages one or more times.

In an exemplary embodiment of the invention, at least a portion of the coalescing operations described for FIG. 1B and/or for FIG. 1C may be implemented in the RX processing block 150 in FIG. 1D. In this instance, buffering or storage of TCP data may be performed by, for example, the frame buffer 154. Moreover, the flow lookup table (FLT) utilized by the RX processing block 150 may be implemented using the off-chip storage 160 and/or the on-chip storage 162, for example.

In an embodiment of the invention, a new flow may be detected at some point during the flow lifetime. The flow state is unknown when the new flow is detected and the first packets are utilized to update the flow state until the flow is known to be in-order. A device performing TTO may also support other offload types, for example, TOE, RDMA, or iSCSI offload. In this case, the FLT for TTO may be shared with the connection search for other offload types with each entry in the FLT indicating the offload type for that flow. Packets that belong to flows of other offload types may not be candidates for TTO. Upon detecting a new flow, the flow may be initiated with the basic initialization context. An entry in the FLT with a flow ID may be created.

In another embodiment of the invention, a plurality of segments of the same flow may be aggregated in TTO up to a receive aggregation length (RAL), presenting to the host a bigger segment for processing. If aggregation is allowed, the received packet may be placed in the host memory 126 but will not be delivered to the host. Instead, the host processor 124 may update the context of the flow this packet belongs to. The new incoming packet may either cause the packet to be delivered immediately alone if there were no prior aggregated packets that were not delivered or as a single packet that represents both that packet and the previously received packets. In another embodiment of the invention, the packet may not be delivered but may update the flow's context.

A termination event may occur and the packet may not be aggregated if at least one of the following occurs at the TCP level: (1) the data is not in-order as derived from the received sequence number (SN) and the flow's context; (2) at least one packet with TCP flags other than ACK flag, for example, a PUSH flag is detected; (3) at least one packet with selective acknowledgement (SACK) information is detected; or (4) if the ACK SN received is bigger than the delivered ACK SN, and requires stopping the aggregation. Similarly, a termination event may occur and the packet may not be aggregated if at least one of the following occurs at the IP level: (1) the type of service (TOS) field in the IP header is different than the TOS field of the previous packets that were aggregated; or (2) the received packet is an IP fragment.

When aggregating a plurality of packets to a single packet, the aggregated packet's header may contain the aggregated header of all the individual packets it contains. In an exemplary embodiment of the invention, a plurality of TCP rules for the aggregation may be as follows. For example, (1) the SN in the aggregated header is the SN of the first or oldest packet; (2) the ACK SN is the SN of the last or youngest segment; (3) the length of the aggregated header is the sum of the lengths of all the aggregated packets; (4) the window in the aggregated header is the window received in the last or youngest aggregated packet; (5) the time stamp (TS) in the aggregated header is the TS received in the first or oldest aggregated packet; (6) the TS-echo in the aggregated header is the TS-echo received in the first or oldest aggregated packet; and (7) the checksum in the aggregated header is the accumulated checksum of all aggregated packets.

In an exemplary embodiment of the invention, a plurality of IP field aggregation rules may be provided. For example, (1) the TOS of the aggregated header may be that of all the aggregated packets; (2) the time-to-live (TTL) of the aggregated header is the minimum of all incoming TTLs; (3) the length of the aggregated header is the sum of the lengths in the aggregated packets; (4) the fragment offset of the aggregated header may be zero for aggregated packets; and (5) the packet ID of the aggregated header is the last ID received.

The received packets may be aggregated until the received packet cannot be aggregated due to the occurrence of a termination event, or if a timeout has expired on that flow, or if the aggregated packet exceeds RAL. The timeout may be implemented by setting a timeout to a value, timeout aggregation value, when the first packet on a flow is placed without delivery. The following packets that are aggregated may not change the timeout. When the packets are delivered due to timeout expiration the timeout may be canceled and may be set again in the next first packet that is not delivered. Notwithstanding, other embodiments of the invention may provide timeout implementation by periodically scanning all the flows.

In an exemplary embodiment of the invention, the received ACK SN may be relevant to determine the rules to aggregate pure ACKs and to determine the rules to stop aggregation of packets with data due to the received ACK SN. The duplicated pure ACKs may never be aggregated. When duplicated pure ACKs are received, they may cause prior aggregated packets to be delivered and the pure ACK may be delivered immediately separately. The received ACK SN may also be utilized to stop the aggregation and deliver the pending aggregated packet to the host TCP/IP stack.

In an exemplary embodiment of the invention, a plurality of rules may be provided for stopping the aggregation according to the ACK SN. For example, (1) if the number of acknowledged (ACKed) bytes that are not yet delivered, taking into account the received segments and the prior segments that were not delivered exceeds a threshold, ReceiveAckedBytesAggretation, for example, in bytes; or (2) the time from the arrival of the first packet that advanced the received ACK SN exceeds a threshold, TimeoutAckAggregation, for example. For this purpose, a second timer per flow may be required or other mechanisms, such as periodically scanning the flows may be implemented.

In another exemplary embodiment of the invention, the flows may be removed from the host memory if one of the following occurs: (1) a reset (RST) flag was detected in the receive side; (2) a finish (FIN) flag was detected in the receive side; (3) there was no receive activity on the flow for a predefined time TerminateNoActivityTime, for example; (4) a KeepAlive packet in the receive direction was not acknowledged. A least recently used (LRU) cache may be used instead of a timeout rule to remove the flows from the host memory.

In another exemplary embodiment of the invention, the flows may be removed from the host memory if the flow was closed due to a retransmission timeout that requires information from the transmitter. In one exemplary embodiment of the invention, retransmission timeout may comprise periodically scanning all the flows to determine if any flow is closed. The period for scanning may be low, for example, 5 seconds. In each scan, if there is unacknowledged data that was transmitted by the NIC 128 the maximum transmitted sequence number (SN) may be recorded. Additionally, if there is unacknowledged data that was transmitted by the peer side, the maximum received SN may be recorded. If in two consequent scans there is pending data on same flow of the same type with the recorded number unchanged, pending data that was not acknowledged for the entire scan period may be indicated. In this case the flow may be removed.

Figure 2:
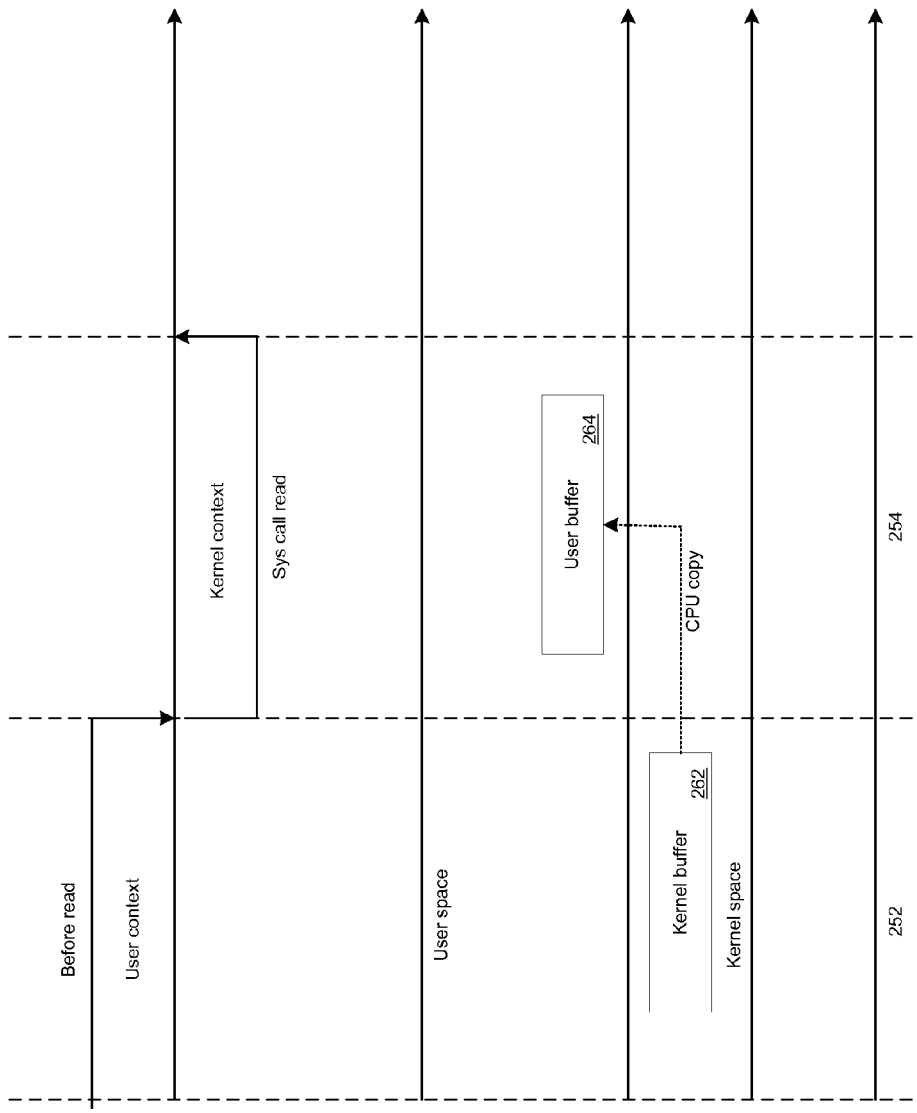
FIG. 2 is a flow diagram illustrating copying of data for a read operation in a host CPU system, in accordance with an embodiment of the invention.

FIG. 2 is a flow diagram illustrating copying of data for a read operation in a host CPU system, in accordance with an embodiment of the invention. Referring to FIG. 2, there is shown various context switches, a user buffer 264, a kernel buffer 262, a NIC memory 268, and copy operations to be performed for a read operation. In step 252, the read system call may cause a context switch from user mode to kernel mode. A copy may be performed to transfer the data into a kernel buffer 262. In step 254, the read system call may return, creating another context switch. Another copy may occur as the DMA engine may pass the data from the kernel buffer 262 to the NIC memory 268 independently and asynchronously. The data duplication may not be necessary and may be eliminated to decrease overhead and increase performance. To eliminate overhead, some of the copying between the kernel buffer 262 and user buffers 264 may be eliminated.

With the send zero-copy approach, the data may be read immediately from the disk into the OS cache memory using direct memory access (DMA) hardware. Data to be transferred may be taken directly from system buffers, without context switching, and without trashing the cache. Thus, the usage of send zero copy in server applications may significantly reduce CPU load.

The user buffer 264 may be posted to the NIC 128 for DMA transfer and the user pages may be marked with a copy on write (COW) attribute, so that if the user attempts writing to them, the kernel may trap these writes. The page may be copied to a different location and the new page may be remapped to the user application. Zero copy may be implemented not only on SendFile operations, but rather on send operations, by detecting the application usage pattern and selecting zero copy for applications that do not attempt writing to send buffers immediately.

Figure 3:
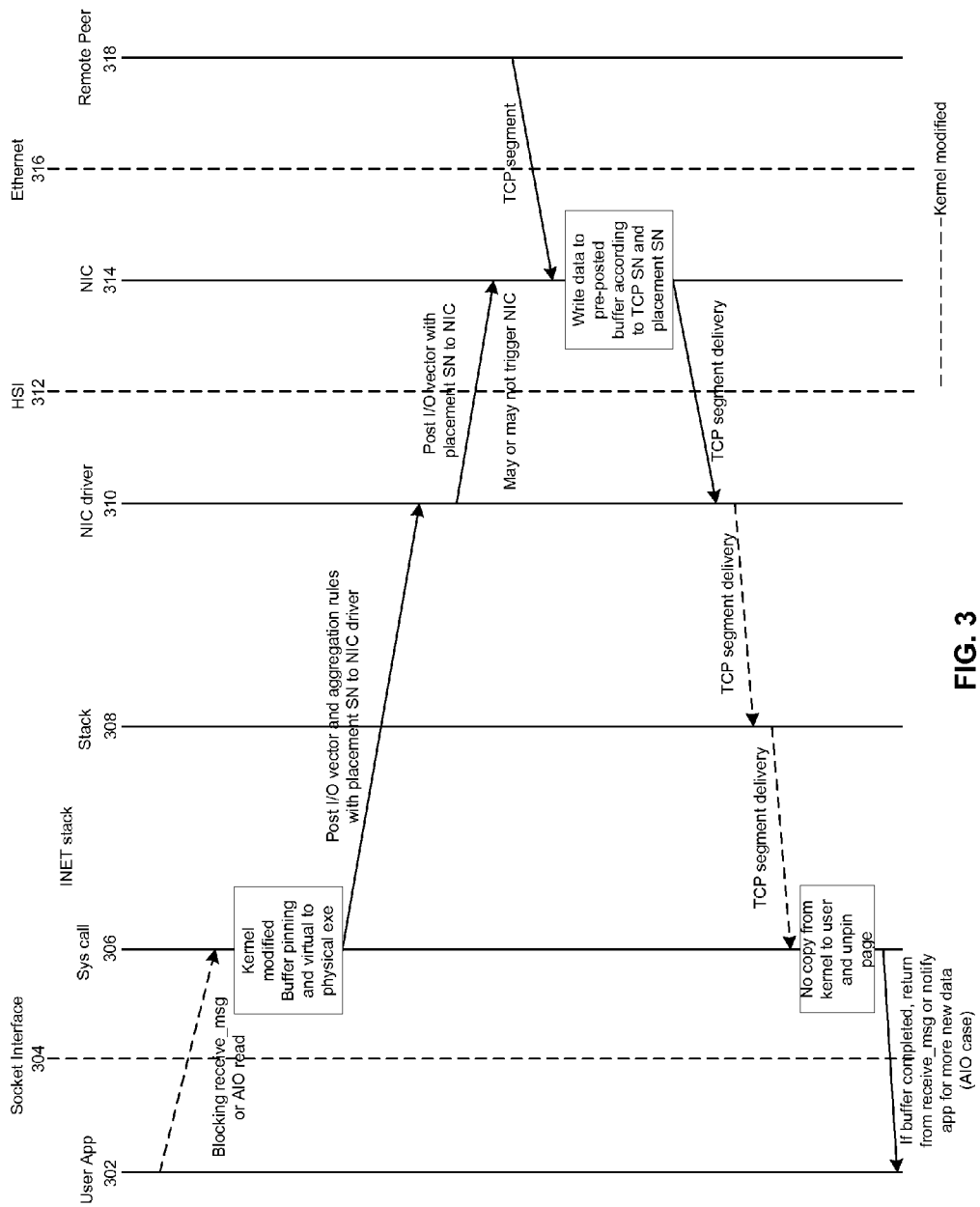
FIG. 3 is a flow diagram illustrating transparent TCP offload with best effort direct placement of incoming traffic, in accordance with an embodiment of the invention.

FIG. 3 is a flow diagram illustrating transparent TCP offload with best effort direct placement of incoming traffic, in accordance with an embodiment of the invention. Referring to FIG. 3, there is shown a user application 302 that may transmit a message to the NIC 314. The message may comprise a blocking receive message in case of a synchronous API or an asynchronous I/O read message (AIO_read) within I/O user space corresponding to the user buffer 126 (FIG. 1C). The system call 306 may pin the user buffer 126 to skip copying the user data to a kernel buffer and allow the NIC 314 to read the user data directly from the user buffer 126. The address of the user buffer 126 in the I/O user space may be translated into a kernel address.

The system call 306 may post the I/O user space corresponding to the user buffer 126 and aggregation rules with placement sequence number (SN) to the NIC driver 310. The NIC driver 310 may further post the I/O user space corresponding to the user buffer 126 and placement sequence number (SN) to the NIC 314, which may or may not trigger the NIC 314. The NIC 314 may receive an aggregated TCP segment from the remote peer 318 and write the received data to a pre-posted buffer according to the TCP SN and the placement SN. When the NIC 314 receives subsequent incoming TCP segments from the remote peer 318, it may determine whether they are in-order. If subsequent incoming TCP segments are in order and the NIC 314 has received the placement information for the specific flow and the specific sequence numbers, the NIC 314 may place the received data in the user buffer 126 and the headers in a kernel buffer. The NIC driver 310 may mark the user buffer 126 by setting a flag, for example, a copy already done flag and may pass it to the stack 308 for further processing. The stack 308 may perform TCP processing but may skip the copying of data to the kernel buffer. The user application 302 may be accessed by the system call 306 and the user buffer 126 may be unpinned before control is returned to the user.

A primary difference between a synchronous API mode and an asynchronous mode in receive operation is that in asynchronous API, the application may post multiple receive buffers in advance, while for the synchronous API the application may only post one buffer at a time.

In accordance with an embodiment of the invention, a method and system for transparent TCP offload with best effort direct placement of incoming traffic may include determining whether to perform a zero copying operation based on receiving a particular TCP segment from a remote peer 318 after receiving the placement information for the specific flow and the specific sequence numbers from the host processor 124 or system call 306. The NIC 314 may place the received data in the user buffer 126 and the headers in a kernel buffer. The dynamic zero copy operation may avoid the intermediate placement of data in kernel buffers, which requires further copy of the kernel buffers to user buffers.

In accordance with an embodiment of the invention, a NIC processor 130 (FIG. 1C) may enable collection of at least one transmission control protocol (TCP) segment received for a particular network flow without transferring state information regarding the particular network flow to a host processor 124 every time the TCP segment is received. The NIC processor 130 may enable generation of a new TCP segment comprising the collected TCP segments after a termination event occurs. The NIC processor 130 may enable receiving of at least one placement sequence number corresponding to the generated new TCP segment for the particular network flow. The NIC processor 130 may enable transferring the generated new TCP segment directly to the user buffer 126 instead of transferring the data to a kernel buffer based on the received at least one placement sequence number, which would require further copy by the host stack from kernel buffer to user buffer 126.

The NIC processor 130 may enable placement of payload data corresponding to the generated new TCP segment in a user buffer 126, if at least one placement sequence number corresponding to the generated new TCP segment is received before the new TCP segment is received. The host stack 308 may enable pinning at least one page in the user buffer 126 to skip copying of the payload data corresponding to the generated new TCP segment to a kernel buffer. The NIC processor 130 may enable placement of header information corresponding to the generated new TCP segment in the kernel buffer, if at least one placement sequence number corresponding to the generated new TCP segment is received before the generated new TCP segment. The host stack 308 may enable unpinning of at least one page in the user buffer 126 after the host processor 124 receives the generated new TCP segment. The NIC processor 130 may enable marking of the generated new TCP segment as copy already done after zero copying of the generated new TCP segment. The NIC processor 130 may enable generation of the new TCP segment by aggregating at least a portion of a plurality of the collected TCP segments for the particular network flow. The NIC processor 130 may enable detection of a state of the particular network flow to be at least one of: an in order state, an out of order state, and an unknown state. The NIC processor 130 may enable updating of the detected state based on the collected TCP segments.

Another embodiment of the invention may provide a machine-readable storage, having stored thereon, a computer program having at least one code section executable by a machine, thereby causing the machine to perform the steps as described above for performing transparent TCP offload with best effort direct placement of incoming traffic.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    collecting, by a network interface card (NIC) processor, a plurality of transmission control protocol (TCP) segments received for a particular network flow without transferring state information regarding said particular network flow to a host processor; and
    copying a new TCP segment directly to said host processor without data corresponding to said new TCP segment being copied to a kernel buffer, based at least in part on receiving at least one placement sequence number corresponding to said new TCP segment for said particular network flow.

2. The method according to claim 1, comprising generating said new TCP segment by aggregating at least a portion of said collected plurality of said TCP segments received for said particular network flow.

3. The method according to claim 1, comprising generating said new TCP segment based at least in part on an occurrence of a termination event.

4. The method according to claim 3, wherein said termination event occurs when one or more of the following occurs:

a TCP/Internet Protocol (TCP/IP) frame associated with said particular network flow comprises a TCP flag with one or more of: a push (PSH) bit, a finish (FIN) bit, or a reset (RST) bit;
   a TCP/IP frame associated with said particular network flow comprises a TCP payload length that is equal to or greater than a maximum IP datagram size;
   a timer associated with said collecting of said plurality of TCP segments expires;
   a new entry in a flow lookup table (FLT) is generated when said FLT is full;
   a first IP fragment associated with said particular network flow is received;
   a transmit window is modified;
   a change in a number of TCP acknowledgments (ACKS) is greater than or equal to an ACK threshold;
   a TCP/IP frame associated with said particular network flow comprises a selective TCP acknowledgment (SACK); or
   a TCP/IP frame associated with said particular network flow comprises a number of duplicated TCP acknowledgments that is equal to or greater than a duplicated ACK threshold.

5. The method according to claim 1, comprising placing payload data corresponding to said new TCP segment in a user buffer, if said at least one placement sequence number corresponding to said new TCP segment is received before said new TCP segment is generated.

6. The method according to claim 5, comprising pinning at least one page in said user buffer to skip copying of said placed payload data corresponding to said new TCP segment to said kernel buffer.

7. The method according to claim 6, comprising unpinning said pinned said at least one page in said user buffer after said host processor receives said new TCP segment.

8. The method according to claim 1, comprising marking said new TCP segment as copy already done after said copying of said new TCP segment directly to said host processor without said data corresponding to said new TCP segment being copied to said kernel buffer.

9. The method according to claim 1, comprising placing header information corresponding to said new TCP segment in said kernel buffer, if said at least one placement sequence number corresponding to said new TCP segment is received before said new TCP segment is generated.

10. The method according to claim 1, comprising detecting a state of said particular network flow to be one of an in order state, an out of order state, or an unknown state.

11. A system, comprising:
    one or more processors that is operable to collect a plurality of transmission control protocol (TCP) segments received for a particular network flow without transferring state information regarding said particular network flow to a host processor; and
    said one or more processors is operable to copy a new TCP segment directly to said host processor without data corresponding to said new TCP segment being copied to a kernel buffer, based at least in part on receiving at least one placement sequence number corresponding to said new TCP segment for said particular network flow.

12. The system according to claim 11, wherein said one or more processors is operable to generate said new TCP segment by aggregating at least a portion of said collected plurality of said TCP segments received for said particular network flow.

13. The system according to claim 11, wherein said one or more processors is operable to generate said new TCP segment based at least in part on an occurrence of a termination event.

14. The system according to claim 13, wherein said termination event occurs when one or more of the following occurs:
- a TCP/Internet Protocol (TCP/IP) frame associated with said particular network flow comprises a TCP flag with one or more of: a push (PSH) bit, a finish (FIN) bit, or a reset (RST) bit;
- a TCP/IP frame associated with said particular network flow comprises a TCP payload length that is equal to or greater than a maximum IP datagram size;
- a timer associated with said collecting of said plurality of TCP segments expires;
- a new entry in a flow lookup table (FLT) is generated when said FLT is full;
- a first IP fragment associated with said particular network flow is received;
- a transmit window is modified;
- a change in a number of TCP acknowledgments (ACKS) is greater than or equal to an ACK threshold;
- a TCP/IP frame associated with said particular network flow comprises a selective TCP acknowledgment (SACK); or
- a TCP/IP frame associated with said particular network flow comprises a number of duplicated TCP acknowledgments that is equal to or greater than a duplicated ACK threshold.

15. The system according to claim 11, wherein said one or more processors is operable to place payload data corresponding to said new TCP segment in a user buffer, if said at least one placement sequence number corresponding to said new TCP segment is received before said new TCP segment is generated.

16. The system according to claim 15, wherein said one or more processors is operable to pin at least one page in said user buffer to skip copying of said placed payload data corresponding to said new TCP segment to said kernel buffer.

17. The system according to claim 16, wherein said one or more processors is operable to unpin said pinned said at least one page in said user buffer after said host processor receives said new TCP segment.

18. The system according to claim 11, wherein said one or more processors is operable to mark said new TCP segment as copy already done after said copying of said new TCP segment directly to said host processor without said data corresponding to said new TCP segment being copied to said kernel buffer.

19. The system according to claim 11, wherein said one or more processors is operable to place header information corresponding to said new TCP segment in said kernel buffer, if said at least one placement sequence number corresponding to said new TCP segment is received before said new TCP segment is generated.

20. The system according to claim 11, wherein said one or more processors is operable to detect a state of said particular network flow to be one of an in order state, an out of order state, or an unknown state.

* * * * *